United States Patent [19]
Pan

[11] Patent Number: 5,274,017
[45] Date of Patent: Dec. 28, 1993

[54] FLAME RETARDANT CARBONATE POLYMER CONTAINING SELECTED METAL OXIDES

[75] Inventor: Wie-Hin Pan, Evansville, Ind.

[73] Assignee: General Electric Company, Pittsfield, Mass.

[21] Appl. No.: 440,959

[22] Filed: Nov. 24, 1989

[51] Int. Cl.$^5$ .............. C08K 5/54; C08K 3/36; C08K 3/22
[52] U.S. Cl. .................. 524/162; 524/164; 524/158; 524/163; 524/266; 524/413; 524/436; 524/437
[58] Field of Search .............. 524/161, 162, 164, 158, 524/163, 266, 403, 408, 413, 436, 437, 165, 611, 433, 430, 411, 412; 525/146

[56] References Cited

U.S. PATENT DOCUMENTS

| | | |
|---|---|---|
| 3,741,893 | 6/1973 | Mascioli et al. . |
| 3,935,157 | 1/1976 | Schiller et al. ............ 524/403 |
| 4,223,100 | 9/1980 | Reinert . |
| 4,357,271 | 11/1982 | Rosenquist ............ 524/611 |
| 4,394,469 | 7/1983 | Stratta et al. . |
| 4,430,470 | 2/1984 | Taniguchi et al. . |
| 4,548,979 | 10/1985 | Weise et al. . |
| 4,563,496 | 1/1986 | Lindner et al. . |
| 4,735,978 | 4/1988 | Ishihara . |
| 4,772,655 | 9/1988 | Krishnan et al. . |

FOREIGN PATENT DOCUMENTS 63-105059  5/1988  Japan .

Primary Examiner—Veronica P. Hoke

[57] ABSTRACT

Aromatic carbonate polymers are flame retarded by an effective amount of a metal oxide of aluminum, magnesium, lithium, lanthanum, bismuth or yttrium. Colloidal aluminum oxide on silica is particularly effective.

7 Claims, No Drawings

FLAME RETARDANT CARBONATE POLYMER CONTAINING SELECTED METAL OXIDES

BACKGROUND OF THE INVENTION

1. Field of the Invention

This invention relates to improved flame retardant aromatic carbonate polymers containing as a flame retardant additive certain metal oxides.

2. Brief Description of the Prior Art

Flame retardant properties are required for many plastics, especially those involved in electrical and transportation applications. A major flammability test used in electrical applications is the Underwriters Laboratory UL 94 test, to which many flammability standards refer. In this test, a vertical sample of the plastic of specified dimensions is ignited from the bottom by a specified flame burning applied for 10 seconds. Afterflame time and the presence or absence of flaming drips is observed. For many electrical applications, a rating of V0 by this test is the requirement; to achieve such a V0 rating, not only must the plastic sample have an afterflame burning time of less than 10 seconds but it must also not produce flaming drips. Otherwise, if flaming drips occur, or the afterflame burning time exceeds 10 seconds, the sample will be given a less favorable UL 94 rating and will be excluded from the more demanding electrical applications.

One widely used means for achieving high flame retardancy in carbonate polymers, such as V0 ratings by UL 94, hitherto have involved the use of high levels of additive or coreacted brominated compounds, usually used together with antimony oxide. Several difficulties result from this methodology: the additives commonly degrade physical properties of the polymer, for example, heat distortion temperature or impact strength. Bromine compounds and antimony are of some concern in regard to pollution. The presence of brominated components in a thermoplastic frequently causes mold corrosion. Upon combustion of such compositions, the smoke is often elevated by the presence of the flame retardant bromine/antimony system and the vapors contain corrosive hydrogen bromide which can damage nearby electrical circuitry. As alternatives to brominated flame retardants, phosphorus esters such as phosphonates and phosphates have also been used. These can cause some exudation problems, and also face environmental and toxicological questions.

Carbonate polymers in particular have been flame retarded with various sulfonate salts such as those polyfluorinated sulfonate salts described in U.S. Pat. No. 3,775,367 assigned to Bayer or the aromatic sulfonate salts such as those described in U.S. Pat. Nos. 3,940,366, 3,933,734, 3,948,851, 3,926,908, and 3,909,490 assigned to General Electric Company. However, such salts introduce halogen (with the problems cited above) and/or sulfur into the polymer which inherently contributes corrosive combustion products such as sulfur oxides if the polymer is involved in a large fire that overrides the flame retardant.

An alternative approach to flame retarding certain thermoplastics is to introduce high loadings of mineral hydrates which release water endothermically when exposed to a fire; examples are alumina trihydrate and magnesium hydroxide. However, such high loadings greatly compromise the physical properties of most plastics, and are particularly detrimental in carbonate resins.

It is an object of the present invention to provide inorganic nonhalogenated flame retardant additives for carbonate polymers which are effective at low levels, inexpensive, nonvolatile, noncorrosive and which pose minimal toxicological or environmental problem.

I have found that this requirement is met by flame retardant quantities of certain metal oxides. These results are surprising, in that certain dioxides, for example, titanium dioxide, which have been added to polycarbonates as pigments, as taught for example in Baron et al., U.S. No. Pat. 4,049,614 (1977), are not flame retardant. To flame retard such compositions, Baron et al. teach that that additional brominated components must be added.

SUMMARY OF THE INVENTION

The present invention provides flame retardant carbonate polymers which contain an effective flame retardant amount of one or more oxides of aluminum, magnesium, lithium, lanthanum, bismuth or yttrium.

The preferred metal oxide is aluminum oxide and most preferred is a high surface area aluminum oxide supported on silica of colloidal particle size.

Combinations of the metal oxides enumerated above with polytetrafluoroethylene to retard flaming drips are also contemplated as being within the invention.

DETAILED DESCRIPTION OF THE INVENTION

The composition of the invention is a flame retardant thermoplastic comprising at least one aromatic carbonate polymer and an effective flame retarding amount of a metal oxide selected from the group consisting of oxides of aluminum, magnesium, lithium, lanthanum, bismuth or yttrium.

For reasons of cost effectiveness, the preferred metal oxide is aluminum oxide. Most preferred is an alumina supported on silica. It is further preferred that the metal oxide be a finely divided powder, such as of particle size less than about 20 microns and more preferably of colloidal particle size, less than about 1 micron.

Flame retardant amounts of the metal oxides are in the range of from about 0.02% to about 10% by weight of the carbonate polymer, preferably from about 0.05% to about 5%. It will be recognized by those skilled in flame retardant polymer formulation that the optimum amount within this range will depend on the stringency of standards to be met, on the thickness of molded parts to be fabricated, and such practical considerations. In the case of aluminum oxide supported on silica of colloidal dimensions, the amount of aluminum oxide needed to achieve V0 ratings of flammability can be toward the lower end of the above-cited range.

When used in conjunction with other flame retardants, the amounts can be toward the low end of the cited range.

When used to make resins for fabrication of thin sections, which are harder to flame retard, the levels will typically be toward the high end of the broader range.

The aromatic carbonate polymers for use in the present invention encompass polycarbonates as well as polyester-carbonates. The method of preparation of polycarbonates by interfacial polymerization are well known; see for example the details provided in the U.S. Pat. Nos. 3,028,365; 3,334,154; 3,275,601; 3,915,926;

3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

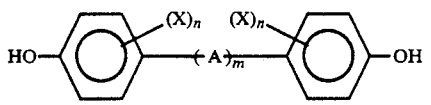

(I)

wherein A is a divalent hydrocarbon radical containing from 1 to about 15 carbon atoms; a substituted divalent hydrocarbon radical containing from 1 to about 15 carbon atoms and substituent groups such as halogen; —S—; —SS—; —S(O)—; —S(O)$_2$—; —O—: or —C—; wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 4.

Typical of some of the dihydric phenols that can be employed in the practice of the present invention are bis-phenols such as bis-(4-hydroxyphenyl)- methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'- dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4-hydroxy-3,5-dichlorophenyl)-propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The aromatic carbonate polymers suitable for use as component (a) of the compositions of the invention include polyester-carbonates, also known as copolyester-polycarbonates, i.e., resins which contain, in addition to recurring polycarbonate chain units of the formula:

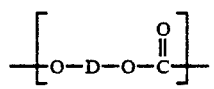

(IIa)

wherein D is a divalent aromatic radical of the dihydric phenol employed in the polymerization reaction, repeating or recurring carboxylate units, for example of the formula:

$$[O-C(O)-R^1-C(O)-O-D] \quad (IIb)$$

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

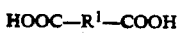

$$HOOC-R^1-COOH \quad (III)$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

$$-E-$$

wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:—

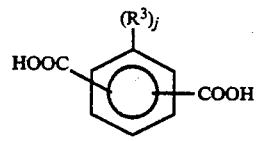

wherein j is a positive whole integer having a value of from 0 to 4 inclusive; and each $R^3$ is independently selected from the group consisting of alkyl radicals, preferably lower alkyl (1 to about 6 C atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for us in the present invention are those derived from bisphenol A and phosgene and having an intrinsic viscosity of about 0.3 to about 1.5 deciliters per gram in methylene chloride at 25°.

The flame retardant metal oxide additives are all well known compounds and are readily available from commercial sources as powders. Included are magnesium oxide, lithium oxide, lanthanum oxide, yttrium oxide and bismuth oxide.

In addition to the use of a flame retardant amount of the metal oxide, it is advantageous to use a drip-retarding amount of fibrilar polytetrafluoroethylene. This is added as a concentrate at the rate of about 0.02 to 2% by weight and has a favorable effect in retarding the occurrence of flaming drips in combustion of the polycarbonate, such as under UL 94 conditions. The use of polytetrafluoroethylene (PTFE) in polycarbonates for this purpose is known in the art.

In an aromatic carbonate polymer, it is possible to use the metal oxide flame retardant in conjunction with other flame retardants which by themselves are known in the art as flame retardants for carbonate polymers. Examples are certain sulfonate salts. Suitable sulfonate salts for use as flame retardants in polycarbonates are reviewed by Ishihara in U.S. Pat. No. 4,735,978 (April 1988) which is incorporated by reference. Also useful are the fluorinated alkylsulfonates such as those disclosed by Nouvertne, U.S. Pat. No. 3,775,367 (1973) or by Liu, U.S. Pat. No. 4,438,231 (Mar. 1984). The preferred sulfonate salt is the potassium salt of sulfonated diphenyl sulfone, because of its high efficiency and ability to provide transparent resin formulations. A flame retardant amount of any of these sulfonates is in the range of about 0.05% to about 5%, preferably about 0.1 to about 2% by weight of the resin. By use of the metal oxide of the present invention, the amount of such sulfonate can be greatly lessened if the sulfonate is used at all.

Although the compositions of the invention achieve flame retardancy without necessitating the use of brominated components, it is also possible to use the flame retardant metal oxides in combination with brominated compounds to achieve very high levels of flame retardancy. In this case, the bromine compound can be, for example, tetrabromobisphenol A employed as a co-reactant in the preparation of the polycarbonate, or a separately prepared tetrabromobisphenol A-containing polycarbonate used in the manner of an additive for a non-brominated polycarbonate. By use of the metal oxides of the invention, the level of bromine need not be as high as if the metal oxide were not present, in order to achieve a given level of flame retardancy.

The metal oxide used in the invention may tend to have a somewhat unfavorable interaction, in terms of degradation and retardation of flow, with the carbonate polymer during processing such as in mixing and molding, particularly at high temperatures. To avoid this, it is advantageous to treat the surface of the metal oxide by a surface pacifying (deactivating and lubricating) amount, generally in the amount of from 0.05 to 5% of any compound having SiH or SiOH groups free to react with a metal oxide surface. Preferred is a polysiloxane, for example, a polydimethylsiloxane oil.

The production of the compositions of the invention is done by any of the operations known for the mixing of thermoplastic compositions, such as in a kneading machine such as a Banbury mixer or an extruder, or solvent blending. The sequence of addition is not critical but all components should be thoroughly blended. Blending can be done continuously or batchwise.

The compositions of the invention may be further modified by the addition of other types of additives known to the art of plastics compounding. Such additives can include for example fillers (such as clay or talc), reinforcing agents (such as glass fibers), impact modifiers, other resins, antistats, plasticizers, flow promoters and other processing aids, stabilizers, colorants, mold release agents, ultraviolet screening agents, and the like.

The invention will be better understood with reference to the following examples, which are presented for purposes of illustration rather than for limitation, and which set forth the best mode contemplated for carrying out the invention.

EXAMPLES 1-3

A polycarbonate (Lexan 145, made by General Electric Co., from bisphenol A and phosgene) was admixed with 1 and 2% (by weight) levels of an aluminum oxide supported on silica (15.4% as $Al_2O_3$) applied as a colloidal sol obtained from Nalco Chemical Co. The formulation also included 0.6% of powdered polytetrafluoroethylene (PTFE) concentrate. The PTFE concentrate is made with a mixture of polycarbonate (Lexan ® 145) and tetrabromobisphenol A in a 1:1 ratio followed by drying so that the PTFE concentration is 20% by weight. The water was dried off at 100° F. overnight. The mixture was then extruded at about 490° F. The extruded strands were than chopped and molded into test bars for the UL 94 flammability test. Two thicknesses of test bars were made. Test results by UL 94 were as follows:

| Example No. | 1 | 2 | 3 |
|---|---|---|---|
| Level of alumina/silica | — | 1% | 2% |
| UL 94 results @ 90 mil thickness: | | | |
| Burn time, average | fail | 3 | 2 |
| UL 94 rating | B | V0 | V0 |
| UL 94 results @ 125 mil thickness: | | | |
| Burn time, average | fail | 3 | 2 |
| UL 94 rating | B | V0 | V0 |

What is claimed is:

1. A flame retarded thermoplastic composition which comprises an aromatic carbonate polymer and an effective flame-retarding amount of aluminum oxide supported on silica which aluminum oxide is of colloidal particle size.

2. A flame retarded thermoplastic composition which comprises an aromatic carbonate polymer an effective amount of aluminum oxide supported on silica and a dip-retarding amount of powdered polytetrafluoroethylene.

3. A flame retarded thermoplastic composition which comprises an aromatic carbonate polymer, an effective amount of aluminum oxide supported on silica and a flame retardant amount of a sulfonate salt.

4. A flame retarded thermoplastic composition which comprises an aromatic carbonate polymer, an effective amount of aluminum oxide supported on silica wherein said aluminum oxide supported on silica is surface treated with a surface-pacifying amount of a siloxane sufficient to prevent adverse interaction of said aluminum oxide supported on silica with said carbonate polymer during processing.

5. A flame retarded thermoplastic which comprises a polycarbonate derived from bisphenol A and phosgene, and from about 0.05 to about 5% of alumina supported on silica of particle size less than about 20 microns.

6. A flame retarded thermoplastic composition which comprises an aromatic carbonate polymer as the principal polymeric component and from about 0.02% to 10% of magnesium oxide.

7. A flame retarded thermoplastic composition which comprises an aromatic carbonate polymer and an effective amount of lithium oxide.

* * * * *